US012760705B2

(12) United States Patent
Schall et al.

(10) Patent No.: US 12,760,705 B2
(45) Date of Patent: Oct. 13, 2026

(54) WIND TURBINE SYSTEM WITH A CONTROLLER AND POWER SUPPLY UNIT WITH AN ENERGY STORAGE SYSTEM AS WELL AS ASSOCIATED WIND TURBINE AND METHOD

(71) Applicant: Wobben Properties GmbH, Aurich (DE)

(72) Inventors: Nils-Hendric Schall, Berlin (DE); Michael Hohmann, Bockhorn (DE); Stefan Heller, Ihlow (DE); Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/745,708

(22) Filed: Jun. 17, 2024

(65) Prior Publication Data

US 2024/0418147 A1 Dec. 19, 2024

(30) Foreign Application Priority Data

Jun. 19, 2023 (DE) ..................... 10 2023 115 943.7

(51) Int. Cl.
*F03D 7/02* (2006.01)
*F03D 9/10* (2016.01)

(52) U.S. Cl.
CPC ............. *F03D 7/0204* (2013.01); *F03D 9/10* (2016.05); *F05B 2270/32* (2013.01); *F05B 2270/321* (2013.01)

(58) Field of Classification Search
CPC . F03D 7/0204; F03D 9/10; F03D 9/11; F05B 2270/32; F05B 2270/321
See application file for complete search history.

(56) References Cited

U.S. PATENT DOCUMENTS

2009/0079192 A1* 3/2009 Voss ...................... F03D 7/0224 290/44
2018/0306169 A1* 10/2018 Dharmadhikari ......... H02J 3/32
(Continued)

FOREIGN PATENT DOCUMENTS

EP 4 053 402 A1 9/2022
EP 4 141 256 A1 3/2023
(Continued)

*Primary Examiner* — Nathaniel E Wiehe
*Assistant Examiner* — Jackson N Gillenwaters
(74) *Attorney, Agent, or Firm* — Seed Intellectual Property Law Group LLP

(57) ABSTRACT

Provided is a wind turbine system for a wind turbine with a controller and an energy supply unit with an energy storage system and a network connection. The unit recognizes a normal operating mode in which the turbine is connected with the network, and a separated state in which the turbine is separated. The controller is connected with a wind sensor for acquiring at least one parameter, and comprises an azimuth controller for setting an azimuth angle of the turbine as a function of the parameter. The unit further has a monitoring device, which is supplied with energy from the energy storage system in the separated state, and connected with the wind sensor or an additional wind sensor for acquiring parameters in the separated state, and the unit in the separated state deenergizes the controller or supplies with energy from the energy storage system as a function of the parameter.

18 Claims, 3 Drawing Sheets

(56) References Cited

U.S. PATENT DOCUMENTS

| | | | | |
|---|---|---|---|---|
| 2020/0003181 | A1* | 1/2020 | Brombach | H02J 3/18 |
| 2020/0227918 | A1* | 7/2020 | Busker | H02J 11/00 |
| 2023/0066258 | A1 | 3/2023 | Hawkins et al. | |
| 2023/0184215 | A1* | 6/2023 | Sala Lluma | F03D 9/25 320/101 |
| 2024/0297503 | A1 | 9/2024 | Hawkins et al. | |
| 2025/0230794 | A1* | 7/2025 | Rave | H02P 9/10 |

FOREIGN PATENT DOCUMENTS

| | | | |
|---|---|---|---|
| KR | 20200015699 | A | 2/2020 |
| WO | 2023/031020 | A1 | 3/2023 |

* cited by examiner

3/3

WIND TURBINE SYSTEM WITH A CONTROLLER AND POWER SUPPLY UNIT WITH AN ENERGY STORAGE SYSTEM AS WELL AS ASSOCIATED WIND TURBINE AND METHOD

BACKGROUND

Technical Field

The disclosure relates to the area of wind turbines. Wind turbines are generally known, and used for converting kinetic wind energy into electrical energy. To this end, the wind turbine has a rotor with several rotor blades. The wind exerts a force on the rotor blades of the wind turbine, so as to in this way impart a rotational motion to the rotor. The rotor is coupled with a generator, which is driven by the turning motion of the rotor, and thereby provides electrical energy to be fed into a network, for example a supply network.

Description of the Related Art

For feeding purposes, the wind turbine is thus connected with the network, wherein components for maintaining a reliable operation of the wind turbine can also be supplied with energy from the network if no electrical energy can be derived from the wind by the wind turbine. Such a case is present given very low wind speeds, for example. In addition, there are also known situations in which the wind turbine produces no electrical energy despite sufficient wind speeds due to a reduction or throttling of power, for example prescribed by the network operator. In such cases as well, components of the wind turbine are supplied with energy from the network. For example, a continuous supply of components is necessary so that an angle of rotation of the rotor blades around their longitudinal axis or the alignment of the rotor, i.e., the azimuth angle, can be continuously adapted to changing wind conditions by means of an azimuth drive. This makes it possible to reduce or keep within specific limits a load imposed on the wind turbine by forces resulting from the wind given changing wind directions and/or wind speeds.

Various solutions are known to ensure this type of capability for setting the wind turbine with a controller even in a separated state, in which the wind turbine is not connected with a network. In particular given a separated state, for example one that arises because a wind turbine has not yet been connected with the network after erected, use is frequently made of generators with a combustion engine, for example. For instance, such a generator is set up in the area of the wind turbine, and the wind turbine is supplied with energy, either continuously or if energy is needed for setting purposes. In addition, it is known to provide accumulators, which supply the wind turbine with energy as needed, for example to bridge separating states arising as the result of a short-term network failure.

The known solutions usually call for feeding energy into the wind turbine in the area of the network connection, so that an energy supply unit of a wind turbine need only provide a changeover switch, which supplies components of the wind turbine with energy from the network in a first switch position, and with energy from an energy storage system or generator in a second switch position.

An energy supply unit for a wind turbine in the separated state can thus be provided, and also retrofitted for wind turbines that so far had no energy supply without a network connection.

However, the energy requirement of a wind turbine in a separated state leads to a limited safe operating period over time, in particular when using energy storage systems. Therefore, a longer-lasting separated state is only possible with energy storage systems having a very high capacity.

BRIEF SUMMARY

Provided are techniques for lengthening the period of time for which the safe operation of a wind turbine can be maintained in the separated state.

Therefore, the disclosure proposes a wind turbine system.

As a consequence, the disclosure relates to a wind turbine system for a wind turbine with a controller for controlling the wind turbine and an energy supply unit. The energy supply unit comprises an energy storage system. The wind turbine system further comprises a network connection for connection to a network. The energy supply unit is set up to recognize a normal operating mode of the wind turbine and a separated state of the wind turbine. In the normal operating mode, the wind turbine is connected with the network. In the separated state, the wind turbine is separated from the network. In the normal operating mode, energy can thus be extracted from the network via the network connection. The separated state here comprises a separation of the wind turbine from the network, wherein such a separation also means that no energy can be extracted by the wind turbine from the network, i.e., a physical connection still exists.

In addition, the controller is connected with a wind sensor for acquiring wind parameters. The controller comprises an azimuth controller for setting an azimuth angle of the wind turbine as a function of the wind parameters. For example, wind parameters comprise wind speeds of the wind determined with the wind sensor or mean values for wind speed derived from the progression of wind speed over time, for example a 10 minute mean value. For example, a wind speed is indicated in km/h or m/s. In addition, the wind parameters comprise a wind direction of the wind, for example, which is indicated as an angle in degrees, for example. An angle of 0° corresponds to a wind direction in which the wind hits the wind turbine from a northerly direction. An angle of 90° corresponds to a wind direction in which the wind hits the wind turbine from an easterly direction.

In addition, the energy supply unit comprises a monitoring device. In the separated state, the monitoring device is supplied with energy from the energy storage system. The monitoring device is connected with the wind sensor, with which the controller is connected, and/or an additional wind sensor for acquiring wind parameters, and set up to also acquire wind parameters in the separated state. In addition, the energy supply unit is set up to deenergize the controller or supply it with energy from the energy storage system in the separated state as a function of wind parameters acquired with the monitoring device.

Therefore, the energy supply unit is preferably set up to supply the controller with energy from the network in the normal operating mode. However, if the energy supply unit detects a separated state, the monitoring device is supplied with energy from the energy storage system in the separated state, but the controller is deenergized. If needed, however, the controller can also be supplied with energy from the energy supply system. To this end, wind parameters are monitored with the wind sensor and the monitoring device, and the energy supply unit is used to determine whether the controller is deenergized or supplied with energy from the energy storage system as a function of these wind parameters.

A safe operation of the wind turbine is thus ensured, even if the wind turbine is not connected with the network. That is to say, the disclosure involves having the energy storage system supply energy to the controller of a wind turbine that is used for typical control tasks, in particular for also obtaining a safe state of the wind turbine in the separated state. However, this supply only takes place as needed. If the wind turbine does not need to be adjusted to ensure a safe state, the energy supply to the controller is interrupted. The monitoring device then takes over monitoring tasks of the controller, for example to detect load situations.

Energy can be economized by turning off the controller, so that a wind turbine in the separated state enables a safe state over a longer period of time in relation to a wind turbine known from prior art given the same capacity of an energy storage system with the wind turbine system. The disclosure is based on the knowledge that an isolated monitoring device with a limited functional scope in relation to a controller requires less energy.

According to a first embodiment, the energy supply unit is set up to keep the controller deenergized in the separated state if a wind parameter representing a wind speed lies below at least one predefined threshold value, or a wind parameter representing a wind direction lies within a predefined maximum wind direction range. In addition, the energy supply unit is set up to turn on an energy supply system if the wind parameter representing the wind speed lies above the threshold value and the wind parameter representing the wind direction lies outside of the predefined maximum wind direction range.

Therefore, the controller is kept deenergized in the separated state, i.e., kept in a state in which the controller is not supplied with energy, as long as a wind speed or a wind direction of the wind moves within predefined limit values. The controller is preferably kept deenergized for as long as the wind speed as represented by a wind parameter representing the wind speed remains below the predefined threshold value without a change in wind direction having any influence. Even if the wind parameter representing the wind direction lies outside of the predefined maximum wind direction range but the wind speed remains below the threshold value, the controller thus preferably remains deenergized. Accordingly, the controller remains deenergized if only the wind speed rises above the threshold value, but the wind direction lies in the maximum wind direction range.

The energy supply system of the controller is thus preferably only turned on if the wind parameter representing the wind speed lies above the threshold value, and the wind parameter representing the wind direction lies outside of the predefined maximum wind direction range. Therefore, a change in wind direction does not automatically result in the controller being supplied with energy, as long as the wind speed remains below the threshold value or vice versa.

The embodiment is here based on the knowledge that, in the separated state, the wind turbine is in any case brought into a state where the rotor blades are aligned in such a way that a wind that frontally hits the rotor exerts the smallest possible force on the rotor. Therefore, the rotor blades need not be adjusted around their longitudinal axis given a variation in wind speed. However, if the wind direction changes, the nacelle must be adjusted, i.e., the azimuth angle must be reset, in the case of higher wind speeds. In this instance, the controller is supplied with energy in order to adjust the azimuth angle with the azimuth controller. It was here recognized that the azimuth angle only needs to be adjusted if the change in direction arises at high wind speeds. This further reduces setting procedures, and hence the energy to be expended, in the separated state.

According to another embodiment, the energy supply unit is set up to switch a controller being supplied with energy from the energy storage system to no energy supply in the separated state if the wind parameter representing the wind direction lies within a minimum wind direction range or if the wind parameter representing the wind speed lies below the at least one predefined threshold value or a predefined additional threshold value. Therefore, if the wind speed drops below the predefined threshold value or the additional threshold value, the energy supply to the controller is interrupted. If the wind direction lies within the predefined minimum wind direction range, the energy supply to the controller is likewise turned off.

According to another embodiment, the monitoring device is set up to adjust the maximum wind direction range and/or the minimum wind direction range as a function of a current azimuth alignment of the wind turbine. Therefore, the monitoring device is used to determine the minimum wind direction range or the maximum wind direction range as a function of the current azimuth alignment.

For example, the minimum wind direction range is always determined as the angular range lying between two angles, which correspond to the current angular range plus a value on the one hand, and the current angular range minus the value. The maximum wind direction range is determined analogously, wherein the value for the maximum wind direction range can differ from the value for determination for the minimum wind direction range. For example, assuming a wind direction of 90°, wherein 0° and 360° would correspond to a wind direction from the north, the maximum wind direction range corresponds to wind directions that hit the wind turbine at an angle of between 80° and 100°, for example. By contrast, the minimum wind direction range comprises wind directions with an angle of 85° to 95°, for example.

According to another embodiment, the maximum wind direction range comprises a larger angular range than the minimum wind direction range. The maximum wind direction range preferably corresponds to an angular range lying between −5° or less, preferably −8° or less, from the current azimuth angle and +5° or more, preferably +8° or more, to the current azimuth angle. Therefore, if the current azimuth angle corresponds to a 90° angle, for example, the maximum wind direction range corresponds to a range of 85° to 95° or preferably 82° to 98°, for example. The minimum wind direction range further corresponds to an angular range between an angle corresponding to −5° or more from the current azimuth angle, and an angle corresponding to +5° to the angle of the current azimuth angle.

The provision of two different wind direction ranges, specifically a maximum wind direction range and a minimum wind direction range, wherein the minimum wind direction range is less than the maximum wind direction range, serves to avoid continuously switching back and forth between turning the energy supply to the controller on and off if the wind direction in the edge area of the wind direction range changes. In a case where the energy supply unit recognizes that the wind speed lies above the threshold value and the wind direction lies outside of the maximum wind direction range, the controller is in this way preferably supplied with energy in the separated state so as to adjust an azimuth alignment. The energy supply to the controller is only switched off again if the current wind direction lies within the minimum wind direction range. Therefore, slight changes in wind direction do not ensure that the maximum wind direction range will be exceeded, thus requiring a renewed supply of energy to the controller.

According to another embodiment, the controller is set up to use the azimuth controller for changing the azimuth angle of the wind turbine in the separated state while energy is being supplied by the energy supply unit.

According to another embodiment, the wind turbine system comprises a DC intermediate circuit. The energy supply unit is set up in the separated state to separate or connect the energy storage system from or to the DC intermediate circuit as a function of the wind parameters. Separation and connection preferably take place by means of a DC converter. Separation serves to deenergize the DC intermediate circuit. Connection serves to supply energy to the DC intermediate circuit from the energy storage system. In the normal operating mode, the energy supply unit is further set up to extract energy from the DC intermediate circuit for charging the energy storage system. As a consequence, a DC intermediate circuit serves to provide a constant voltage from the energy storage system regardless of the charge state of the energy storage system, and to charge the energy storage system. The DC intermediate circuit thus provides a constant voltage supply for supplying components of the wind turbine.

According to another embodiment, the energy supply unit is set up in the normal operating mode to connect the DC intermediate circuit with the network via a rectifier circuit and a transformer. Therefore, the same DC intermediate circuit can be used for providing energy from the energy storage system for the components on the one hand, and for providing energy from the network on the other. As a consequence, various components need not be connected or decoupled to/from the energy storage system in the separated state and to/from the network in the normal operating mode, and the components can be wired for energy supply with little complexity.

According to another embodiment, the controller and several azimuth drives are connected with the DC intermediate circuit for energy supply purposes. Each azimuth drive comprises at least one rectifier and at least one azimuth motor. Each rectifier is set up to supply the azimuth motor with energy from the DC intermediate circuit. In particular, the azimuth controller of the controller is used for controlling the rectifier. As a consequence, separating the energy storage system from the DC intermediate circuit as a function of the wind parameters in the separated state makes it possible to simultaneously turn off the energy supply to the controller and azimuth drives.

In addition, the disclosure relates to a wind turbine with a wind turbine system according to one of the aforementioned embodiments.

The disclosure further relates to a method for operating a wind turbine with a wind turbine system according to one of the aforementioned embodiments.

According to a first embodiment, an energy supply unit of a wind turbine system is used to recognize whether the wind turbine is in a normal operating mode or in a separated state. A controller connected with a wind sensor is further used to acquire wind parameters in a normal operating mode. Depending on the wind parameters, the controller and an azimuth controller of the controller are used to set azimuth angles of the wind turbine as a function of the wind parameters in the normal operating mode.

A monitoring device connected with the wind sensor or an additional wind sensor is further used to acquire wind parameters in the separated state of the wind turbine. The energy supply unit is further set up in the separated state to turn off the energy supply to the controller or supply it with energy from the energy storage system as a function of wind parameters acquired with the monitoring device. By contrast, the monitoring device is continuously supplied with energy from the energy storage system in the separated state, i.e., even if the energy supply to the controller was turned off. Given a controller without an energy supply, i.e., when the latter is turned off, since it has no energy for operating purposes, wind parameters are only acquired by the monitoring device.

According to an embodiment, the controller is kept deenergized in the separated state if a wind parameter representing a wind speed lies below a predefined threshold value or a wind parameter representing a wind direction lies within a predefined maximum wind direction range. Energy supply to the controller is turned on if the wind parameter representing the wind speed lies above the threshold value and the wind parameter representing the wind direction lies outside of the predefined maximum wind direction range.

According to another embodiment, the energy supply unit is used in the separated state to turn off the energy supply to a controller supplied with the energy from the energy storage system if the wind parameter representing the wind direction lies within a minimum wind direction range and/or if the wind parameter representing the wind speed lies below the predefined threshold value.

According to another embodiment, the monitoring device is used to adjust the maximum wind direction range and/or the minimum wind direction range as a function of a current azimuth alignment of the wind turbine, wherein the maximum wind direction range preferably has a larger angular range than the minimum wind direction range.

BRIEF DESCRIPTION OF THE SEVERAL VIEWS OF THE DRAWINGS

Additional embodiments may be gleaned based on the exemplary embodiments described in more detail on the figures. Shown here on.

DETAILED DESCRIPTION

Figure 1:
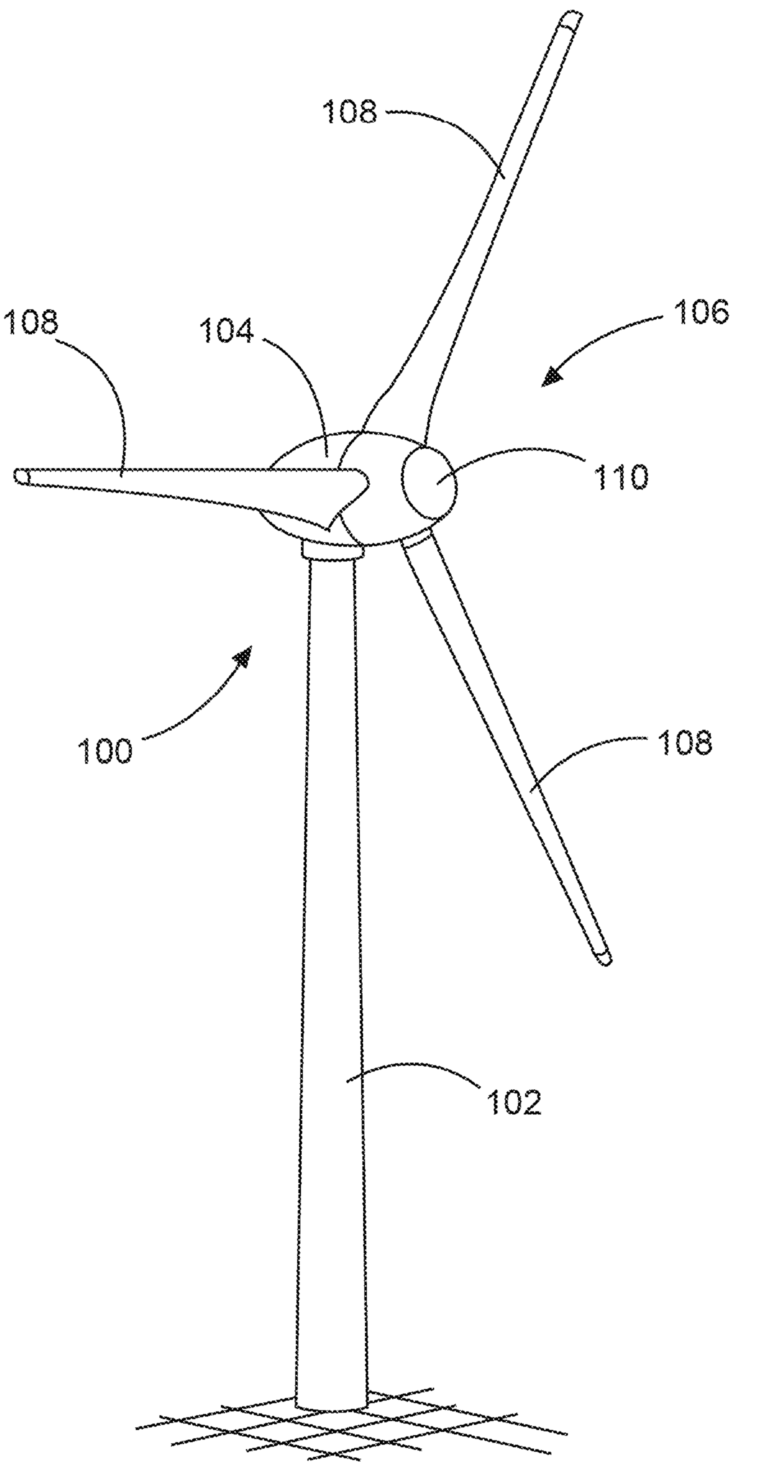
FIG. 1 is a wind turbine.

FIG. 1 shows a schematic view of a wind turbine 100. The wind turbine 100 has a tower 102 and a nacelle 104 on the tower 102. An aerodynamic rotor 106 with three rotor blades 108 and a spinner 110 is provided on the nacelle 104. During operation of the wind turbine 100, the aerodynamic rotor 106 is made to rotate by the wind, and thus also turns an electrodynamic rotor or runner of a wind turbine generator, which is directly or indirectly coupled with an aerodynamic rotor 106. The electric wind turbine generator is arranged in the nacelle 104, and generates electrical energy. The pitch angles of the rotor blades 108 can be changed by pitch motors on the rotor blade roots of the respective rotor blades 108.

Figure 2:
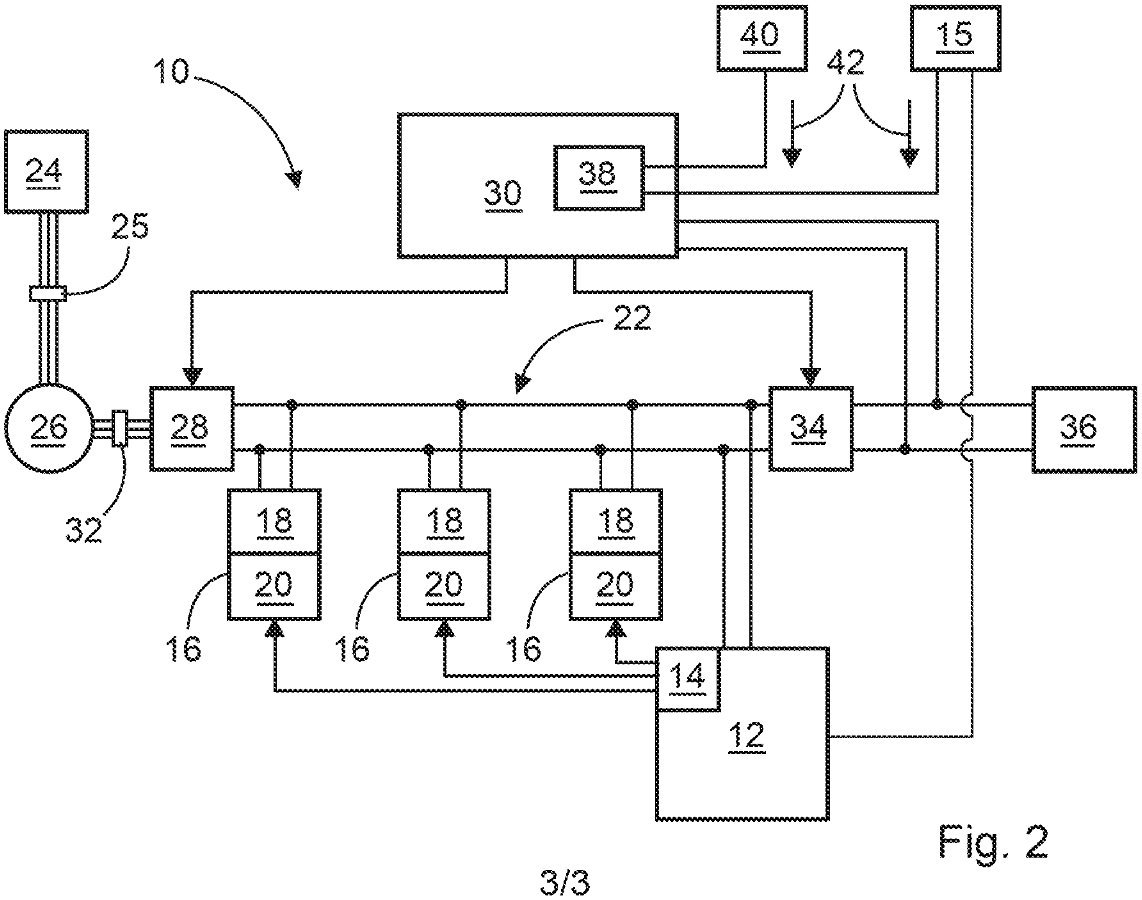
FIG. 2 is an exemplary embodiment of a wind turbine system.

FIG. 2 shows a wind turbine system 10 according to an exemplary embodiment for a wind turbine 100. The wind turbine system 10 comprises a controller 12 that comprises an azimuth controller 14, so as to actuate several azimuth drives 16 of the wind turbine 10, in order to change an azimuth angle of the wind turbine 100 in this way. For this purpose, the controller 12 is connected with a wind sensor 15 (e.g., anemometer).

Each of the azimuth drives 16 comprises at least one respective rectifier 18 and an azimuth motor 20, wherein the rectifiers 18 are connected with a DC intermediate circuit 22, so as to provide energy from the DC intermediate circuit 22 for the allocated azimuth motor 20. The rectifiers 18 are here correspondingly controlled by the azimuth controller 14. The controller 12 is also connected with the DC intermediate circuit 22 in order to extract energy from the DC intermediate circuit 22 for operating the controller 12.

In order to provide energy in the DC intermediate circuit 22, the wind turbine system 10 is connected in the normal operating mode to a network 24 via a network connection 25. In this way, energy is provided from the network 24 with a supply voltage in the DC intermediate circuit 22. To this end, the voltage is converted by a transformer 26, and the energy is fed into the DC intermediate circuit 22 via a rectifier circuit 28. An energy supply unit 30 (e.g., power supply) uses a voltage measuring device 32 (e.g., voltmeter) to detect whether a supply voltage for the DC intermediate circuit 22 can be provided via the network 24, and correspondingly controls the rectifier circuit 28. In the event that the network 24 provides no voltage, this is detected with the voltage measuring device 32, and a separated state is recognized. In the separated state, the energy supply unit 30 is set up to actuate a DC converter 34 in such a way that energy is fed from an energy storage system 36 into the DC intermediate circuit 22.

The wind turbine system 10 further comprises a monitoring device 38, which is connected with the wind sensor 15 and an additional wind sensor 40 so as to receive wind parameters 42. The monitoring device 38 is here shown as part of the energy supply unit 30, so that a decision can be made with the energy supply unit 30 as a function of the wind parameters as to whether the DC intermediate circuit 22 is supplied with energy from the energy storage system 36 or deenergized. This is realized via the DC converter 34. The energy supply unit 30 with the monitoring device 38 is always connected with the energy storage system 36, so that wind parameters can continue to be acquired in the separated state even in a case where the energy supply unit 30 turns off the voltage or energy supply to the DC intermediate circuit 22.

As a consequence, the energy supply unit 30 is set up to supply the controller 12 as well as the azimuth drives 16 with energy so as to adjust an azimuth angle in the case of wind parameters lying outside of predefined limits, and to turn off the energy supply to the controller 12 as well as the azimuth drives 18 in a case where the wind parameters 42 lie within predefined limits. Various ranges and/or values for determining the mentioned limits are stored in the energy supply unit 30 and/or the monitoring device 38 for this purpose. These will be explained with reference to FIG. 3.

Figure 3:
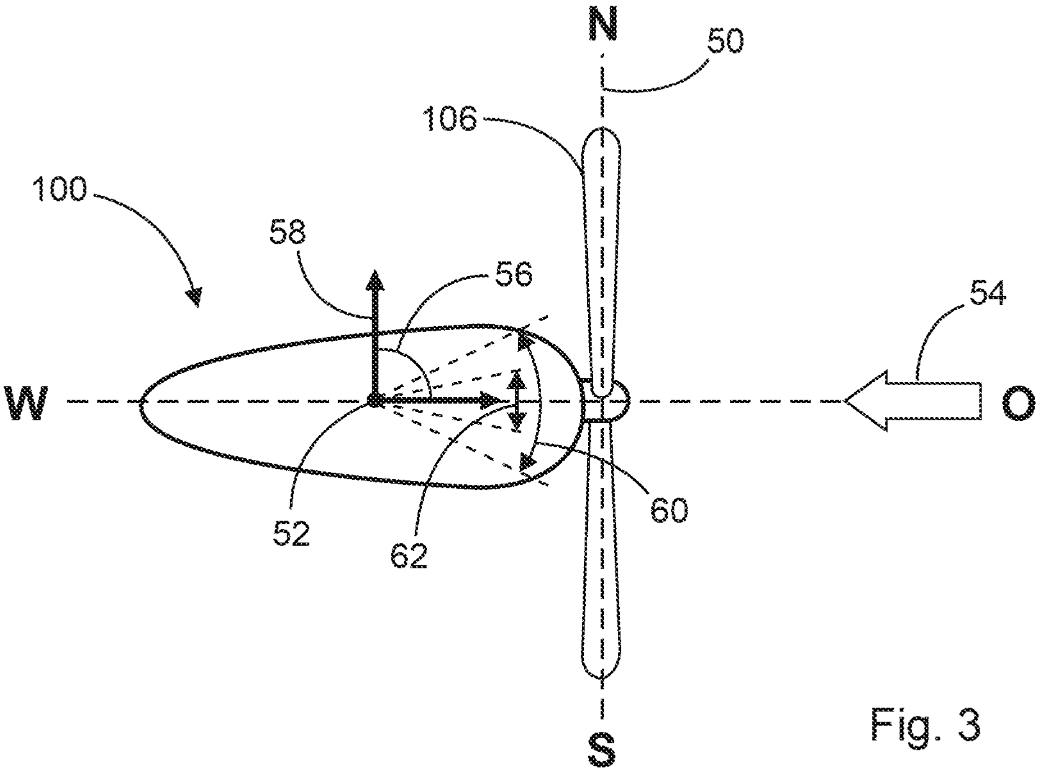
FIG. 3 is a schematic top view of a wind turbine.

Accordingly, FIG. 3 shows a schematic top view of a wind turbine 100. The wind turbine 100 comprises a rotor 106, which forms a rotor plane 50. The nacelle 104 is usually tracked around a center of rotation 52 of a wind direction 54. This tracking corresponds to the setting of an azimuth angle 56. The azimuth angle 56 is here turned by about 90°, for example proceeding from a zero position 58 that points in a northerly direction, thus resulting in an azimuth angle 56 of 90°. Proceeding from the center of rotation 52, the rotor plane 50 thus points in an easterly direction. The wind likewise hits the rotor 106 from an easterly direction, so that the wind direction 54 likewise measures 90° in relation to the northerly direction.

According to the method, a maximum wind direction range 60 lying between +8° and −8° relative to the current azimuth angle 56 is now defined. A minimum wind direction range 62 determined in a range of between +5° and −5° relative to the current azimuth angle 56 is further defined. If the wind direction 54 now changes in such a way as to move outside of the maximum wind direction range 60, this is detected via the monitoring device 38 and/or the energy supply unit 30, and the controller 12 as well as the azimuth drives 16 are supplied with energy via the DC intermediate circuit 22 so as to track the wind turbine 100. Tracking takes place until such time as the wind direction 54 lies within the minimum wind direction range 62 adjusted as a function of the current azimuth angle 56. Energy supply to the controller 12 as well as the azimuth drives 16 is then turned off.

Figure 4:
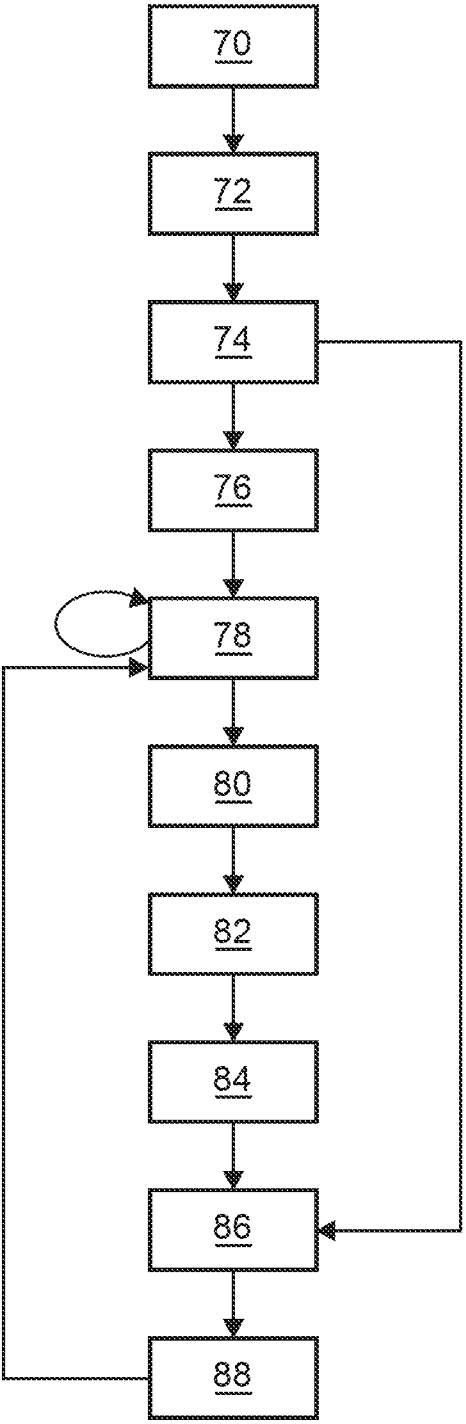
FIG. 4 is an exemplary embodiment of the method.

FIG. 4 shows the steps involved in an exemplary embodiment of the method. In one step 70, a voltage drop of the network 24 is recognized via the voltage measuring device 32. The energy supply unit 30 thus recognizes a separated state in step 72. In step 74, a check is performed to determine whether the current wind direction 54 lies within the minimum wind direction range 62, which is usually the case, since the wind turbine 100 continuously tracks the wind direction 54 with respect to its azimuth angle 56 in the normal operating mode.

If the current wind direction 54 lies within the minimum wind direction range 62, the DC intermediate circuit 22 is deenergized or kept without an energy supply in step 76. The wind parameters 42 are then monitored with the monitoring device 38 (e.g., controller) in step 78. If a change in wind parameters 42 is recognized in step 80 indicating that the wind direction 54 and the wind speed lie outside of predefined limits, i.e., the wind speed lies above the threshold value and the wind direction 54 lies outside of the maximum wind direction range, the DC converter 34 is used in step 82 to feed energy from the energy storage system 36 into the DC intermediate circuit 22 in order to supply the controller 12 and the azimuth drives 16 with energy in step 84. The azimuth angle 56 of the wind turbine 100 is then adjusted in step 86. Step 86 is also performed after step 74 if the current wind direction 54 lies outside of the minimum wind direction range 62 or the maximum wind direction range 60, and the wind speed lies above the predefined threshold value.

If the wind parameters 42 then once again lie within the predefined limits, the energy supply unit 30 is used in step 88 to turn off the energy supply to the controller 12 as well as the azimuth drives 16. Step 78 is then performed once again. The method is performed until such time as the voltage measuring device 32 determines that a network voltage is once again present, so a switch is made back to the normal operating mode, and the DC intermediate circuit 22 is continuously supplied with energy from the network 24.

REFERENCE LIST

10 Wind turbine system
12 Controller
14 Azimuth controller
15 Wind sensor
16 Azimuth drives
18 Rectifier
20 Azimuth motor
22 DC intermediate circuit
24 Network

25 Network connection
26 Transformer
28 Rectifier circuit
30 Energy supply unit
32 Voltage measuring device
34 DC converter
36 Energy storage system
38 Monitoring device
40 Additional wind sensor
42 Wind parameters
50 Rotor plane
52 Center of rotation
54 Wind direction
56 Azimuth angle
58 Zero position
60 Maximum wind direction range
62 Minimum wind direction range
70 Voltage drop recognition
72 Separated state recognition
74 Checking to see whether current wind direction lies within the minimum wind direction range
76 Deenergizing the DC intermediate circuit or keeping it without an energy supply
78 Monitoring the wind parameters
80 Recognizing a change in wind parameters
82 Feeding in energy
84 Supplying energy to controller and azimuth drives
86 Adjusting the azimuth angle
88 Turning off energy supply to the controller and azimuth drives
100 Wind turbine
104 Nacelle
106 Rotor
100 Wind turbine
102 Tower
104 Nacelle
106 Aerodynamic rotor
108 Rotor blades
110 Spinners The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind turbine system for a wind turbine, the wind turbine system comprising:

(a) a controller for controlling the wind turbine; and (b) an energy supply unit with an energy storage system as well as a network connection for connection to a network, wherein;

(i) the energy supply unit is set up to recognize a normal operating mode of the wind turbine in which the wind turbine is connected with the network, and a separated state of the wind turbine in which the wind turbine is separated from the network, and (ii) the controller is connected with a wind sensor for acquiring at least one wind parameter, and comprises an azimuth controller for setting an azimuth angle of the wind turbine as a function of the wind parameter, (iii) the wind turbine system comprises a DC intermediate circuit and a DC converter, (iv) the controller and several azimuth drives are connected with a DC intermediate circuit for energy supply purposes, (v) the energy supply unit further has a monitoring device, which is connected with the wind sensor or an additional wind sensor for acquiring wind parameters in the separated state, (vi) the energy supply unit with the monitoring device is always connected with the energy storage system so that wind parameters can continue to be acquired in the separated state even in a case where the energy supply unit turns off voltage or energy supply to the DC intermediate circuit, and (vii) the energy supply unit is set up in the separated state as a function of the wind parameter acquired with the monitoring device to:

(1) deenergize the DC intermediate circuit by separating the energy storage system from the DC intermediate circuit, or (2) feed energy from the energy storage system into the DC intermediate circuit by actuating the DC converter, in order to supply the controller and the azimuth drives with energy for adjusting the azimuth angle, and thereafter to turn off the energy supply to the controller and the azimuth drives when the wind parameters lie within predefined limits.

2. The wind turbine system according to claim 1, wherein the energy supply unit is set up to keep the controller deenergized in the separated state if a wind parameter representing a wind speed lies below at least one predefined threshold value or a wind parameter representing a wind direction lies within a predefined maximum wind direction range, and turn on an energy supply if the wind parameter representing the wind speed lies above the threshold value and the wind parameter representing the wind direction lies outside of the predefined maximum wind direction range.

3. The wind turbine system according to claim 2, wherein the energy supply unit is set up in the separated state to deenergize the controller supplied with energy from the energy storage system if the wind parameter representing the wind direction lies within a minimum wind direction range or if the wind parameter representing the wind speed lies below at least one predefined threshold value or a predefined additional threshold value.

4. The wind turbine system according to claim 1, wherein the monitoring device is set up to adjust a maximum wind direction range or a minimum wind direction range as a function of a current azimuth angle of the wind turbine.

5. The wind turbine system according to claim 1, wherein a maximum wind direction range has a larger angular range than a minimum wind direction range.

6. The wind turbine system according to claim 5, wherein the maximum wind direction range corresponds to an angular range lying between −8° or less from a current azimuth angle up to 8° or more to the current azimuth angle.

7. The wind turbine system according to claim 5, wherein the minimum wind direction range corresponds to an angular range lying between an angle of −5° or more from a current azimuth angle and an angle of 5° of less to the current azimuth angle.

8. The wind turbine system according to claim 1, wherein the controller is set up to use the azimuth controller and azimuth drives for changing the azimuth angle of the wind turbine in the separated state while energy is being supplied by the energy supply unit.

9. The wind turbine system according to claim 1, wherein the energy supply unit is set up in the separated state to separate the energy storage system with the DC intermediate circuit as a function of the wind parameters, so as to deenergize the DC intermediate circuit, or to connect it, so as to supply energy to the DC intermediate circuit from the energy storage system.

10. The wind turbine system according to claim 9, wherein the DC intermediate circuit is separated from the energy supply unit by way of the DC converter.

11. The wind turbine system according to claim 1, wherein the wind turbine system is set up in the normal operating mode to connect a DC intermediate circuit with the network via a rectifier circuit and a transformer, and to extract energy from the DC intermediate circuit for charging the energy storage system.

12. The wind turbine system according to claim 1, wherein the controller and several azimuth drives are connected with a DC intermediate circuit for energy supply purposes, wherein each azimuth drive has at least one rectifier and at least one azimuth motor, wherein the rectifier of each azimuth drive is set up to supply the azimuth motor with energy from the DC intermediate circuit.

13. The wind turbine with the wind turbine system according to claim 1.

14. A method for operating the wind turbine with the wind turbine system according to claim 1.

15. The method according to claim 14, wherein the controller of the wind turbine is used to receive wind parameters from the wind sensor, and set the azimuth angle of the wind turbine as a function of the wind parameters, wherein the energy supply unit is used to recognize the separated state of the wind turbine and in the separated state to supply energy from the energy storage system to the monitoring device, so as to acquire wind parameters from the wind sensor connected with the monitoring device, wherein the energy supply unit is used in the separated state to supply the controller with energy from the energy storage system or deenergize it as a function of the acquired wind parameters.

16. The method according to claim 14, wherein the controller is kept deenergized in the separated state if a wind parameter representing a wind speed lies below at least one predefined threshold value or a wind parameter representing a wind direction lies within a predefined maximum wind direction range, and energy supply to the controller is turned on if the wind parameter representing the wind speed lies above the threshold value or the wind parameter representing the wind direction lies outside of the predefined maximum wind direction range.

17. The method according to claim 16, wherein the controller supplied with energy from the energy storage system is deenergized in the separated state if the wind parameter representing the wind direction lies within a minimum wind direction range or if the wind parameter representing the wind speed lies below at least one predefined threshold value.

18. The method according to claim 14, wherein a maximum wind direction range or a minimum wind direction range is adjusted as a function of an azimuth angle of the wind turbine.

* * * * *